Sept. 11, 1934.     W. J. BESLER     1,973,326
VALVE FOR BRAKE SYSTEMS
Filed Dec. 30, 1932
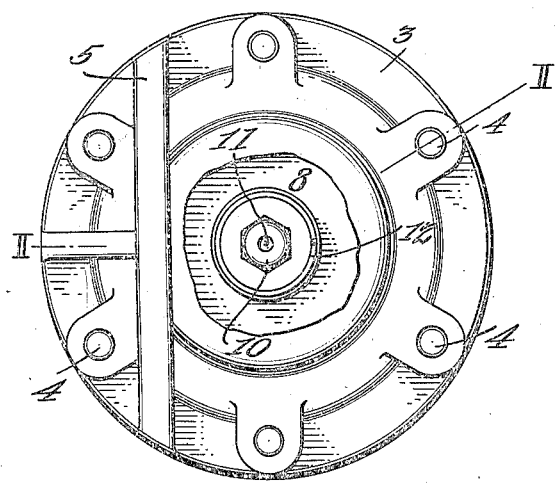
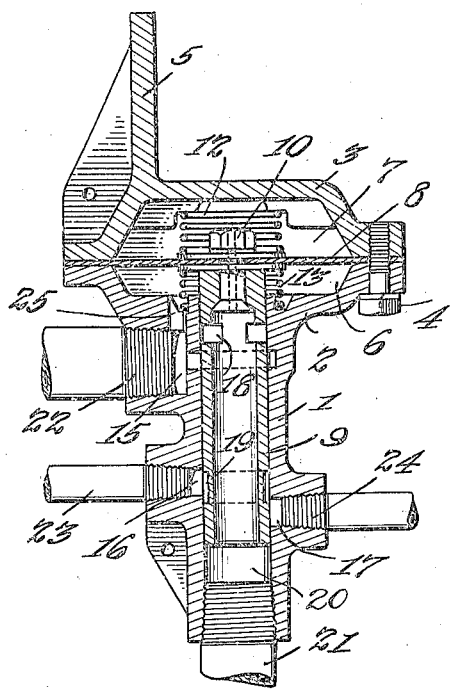
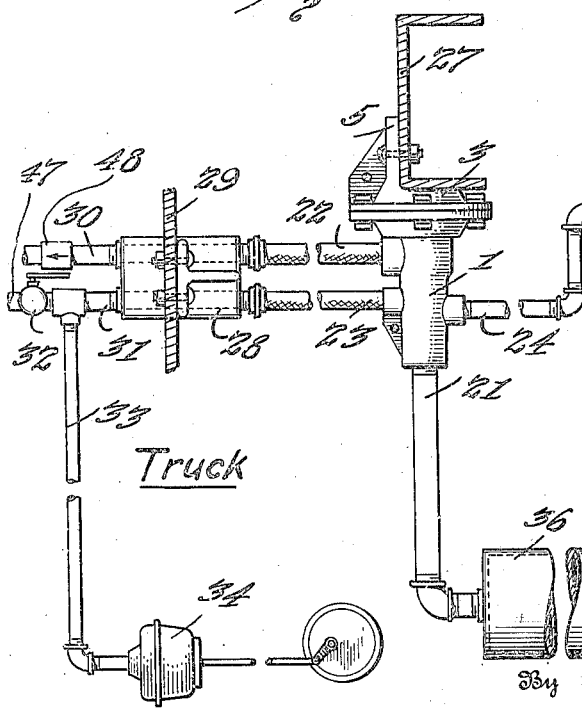
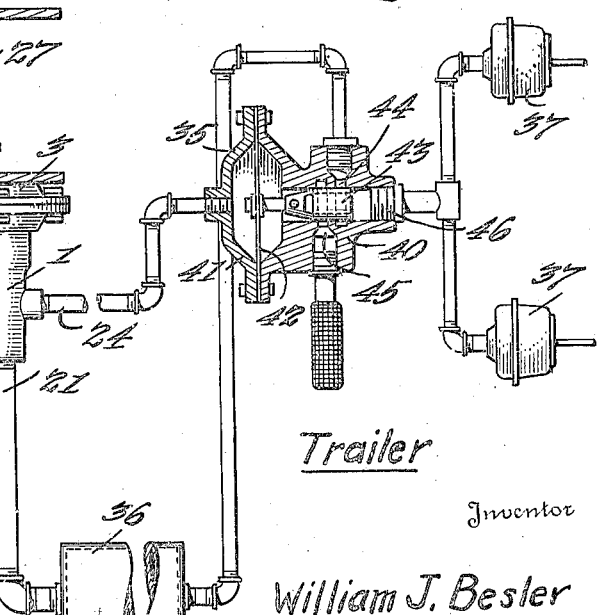
Inventor
William J. Besler
By Lee B. Kenon
his Attorney Patented Sept. 11, 1934

1,973,326

UNITED STATES PATENT OFFICE 1,973,326

VALVE FOR BRAKE SYSTEMS

William J. Besler, Plainfield, N. J.

Application December 30, 1932, Serial No. 649,613

7 Claims. (Cl. 303—31)

This invention relates to valves and more particularly to an emergency valve for use in brake equipments for automotive vehicles and trailers.

One object of the invention is to provide an improved valve of this character of simple and rugged construction.

A further object of the invention is to provide an improved valve for combined truck-trailer braking systems, wherein the trailer is provided with brakes and means including a pressure reservoir on said trailer for operating the same, said valve being adapted to seal the reservoir and automatically apply the brakes in the trailer if the trailer becomes separated from the truck.

A further object of the invention is to provide an improved emergency valve which operates automatically in response to abnormal pressure changes and at once seals the valve port through which the pressure change occurs.

Other objects and advantages of the invention will become apparent from the following detailed description of an embodiment thereof shown in the accompanying drawing, wherein Fig. 1 is a plan or end view of the valve, a part of the end cap being broken away to expose the interior of the valve;

Fig. 2 is a longitudinal section of the valve taken on the line II—II of Fig. 1; and Fig. 3 is a diagrammatic view of a truck trailer braking equipment in which the valve shown in Figs. 1 and 2 is employed.

Referring to Figs. 1 and 2 of the drawing, the valve comprises a hollow body portion or casing 1, having an enlarged end portion 2 closed by a cap member 3 secured to the body portion in any suitable manner, as for example by means of clamping bolts 4. The cap member 3 is preferably provided with an upstanding lug 5 for attachment to the frame of the trailer, whereby the valve may be supported in proper relationship to the equipment with which it is to be used.

The enlarged end portion 2 and the cap member 3 form two opposing recesses or chambers 6 and 7 which are separated by a flexible impervious diaphragm 8 of rubber reinforced with fabric. A movable valve member 9 in the form of a hollow piston or plunger, slidable in the longitudinal chamber of the body portion 1 of the valve, is secured to the diaphragm 8 by a bolt or stud 10. A longitudinal aperture or passage 11 is provided in the bolt or stud 10 to place the recess 7 in communication with the interior of the hollow valve member 9. Compression springs 12 and 13 engage opposite sides of the diaphragm 8 and are of sufficient stiffness to hold the diaphragm and the attached valve member 9 normally in the position shown irrespective of the mounting of the valve; i. e., whether the valve is mounted with its longitudinal axis extending vertically, horizontally or in any other desired manner.

The casing 1 of the valve is provided with lateral ports 15, 16 and 17, adapted to cooperate with ports or passages 18 and 19 in the valve member 9, and another port 20. The passage 18 extends through the section of the valve member 9 and, when the plunger member is displaced downwardly from the position shown in Fig. 2, places the port 15 in communication with the hollow interior of the plunger member. The passage 19 is formed by a reduction in the cross-section of the valve member 9, of such extent that the ports 16 and 17 are normally in communication, as shown in Fig. 2, but such communication is shut off by a slight upward displacement of the valve member 9 from the position shown. Upon a further upward displacement of the valve member 9, the end of said valve member uncovers the port 17 and places the same in communication with the interior of the body portion of the valve, the port 20 and the pipe connection 21 leading thereto, while maintaining the port 16 closed. Pipe connections 22, 23 and 24 are threaded into the body portion of the valve adjacent the ports 15, 16 and 17, respectively. The pipe connection 22 is also in communication at all times with the chamber 6 through an aperture or passage 25 in the body portion of the valve, so that the pressure in said chamber corresponds to that prevailing in the connection 22, while the pressure in the chamber 7 corresponds to that prevailing in the interior of the movable valve member or piston 9.

The described valve is particularly adapted for use as an emergency valve in a truck-trailer braking system, such as that shown diagrammatically in Fig. 3. In the system shown in this figure, the valve 1 is mounted upon the frame 27 of the trailer, the pipe connections 22 and 23 extending from said valve to a coupling member 28 secured to the frame 29 of the truck. The pipe connection 30, in communication with the connection 22, extends to a source of reduced pressure on the truck, such for example as the intake manifold of the internal combustion engine (not shown). A check valve 48 is preferably provided in the pipe connection 30. The pipe connection 31, in communication with the connection 23, is the control line and is connected with a control valve 32, whereby a reduced pressure may be established in said line to apply the brakes or air admitted to release the brakes in the usual manner. A pipe connection 33 may be provided in connection with the control valve 32 to permit energization and release of the vacuum chamber or motor 34 controlling the brakes on the truck, if desired. Pipe connection 47 communicates with source of reduced pressure or a reduced pressure reservoir.

The fitting 1 is connected through the pipe connection 24 to a relay valve 35, and through the pipe connection 21 to an auxiliary reservoir 36. The relay valve 35 is arranged to control the connection of the auxiliary reservoir 36 to the vacuum chambers or motors 37 controlling the brakes on the trailer. The provision of an auxiliary reservoir and relay valve on the trailer, as described, insures a rapid and practically instantaneous application of the brakes on the trailer, even though the control line from the control valve 32 is of considerable length.

The relay valve 35 may be of any suitable construction. For purposes of illustration, a valve is shown comprising a body portion 40 and an end cap 41. A flexible diaphragm 42 is clamped between said end cap and the body portion 40 to provide two pressure chambers, one of which is in communication with the control line 24, and the other with the interior of a hollow, movable piston or valve member 43 flexibly secured to the center of the diaphragm 42. The positioning of the valve member 43, which is dependent upon the relative pressures in said pressure chambers, by reason of the resulting deflection of the diaphragm 42, controls an air port 45 and a port 44 connected to the suction reservoir 36. The movement of the valve member 43 thus serves to control the pressure in the pipe connection 46 leading to the brake motors 37 to apply and release the brakes as desired.

There is a continuous suction in the line 30 whenever the truck engine is in operation. This suction is communicated to the trailer suction reservoir 36 by means of connector 28, hose 22, ports 15 and 18 of valve device 1, and the line 21. Suction from a suction reservoir on the truck is also communicated to the operating valve 32 located on said truck through line 47.

The operation of the system is as follows:

To apply the brakes on both the truck and the trailer, the truck driver operates the valve 32 which admits suction to the line 33 which causes the motor 34 to apply the truck brakes. The operation of valve 32 also admits suction to the line 31 which communicates through the connector 28, hose 23, ports 16 and 17 and passage 19 of valve device 1, and the control line 24 to the relay valve 35. Such suction causes the relay valve 35 to operate thereby admitting suction from the trailer suction reservoir 36 through the relay valve to the trailer brake motors 37, thereby applying the trailer brakes simultaneously with the application of the truck brakes. Reverse operation of the operator's valve 32 admits air and releases all the brakes, the truck brakes by shutting off further suction to the brake motor and admitting air thereto, the trailer brakes by action of the relay valve 35 caused by the decrease in suction, i. e., the increase in absolute pressure, in the control lines 31, 23, and 24, by which action the relay valve interrupts communication between the suction reservoir 36 and the trailer brake motors 37 and also admits air to said motors to release the brakes.

Operation of the trailer brakes is brought about automatically whenever there is a break in the flexible hose connections 22 and 23 between the truck and the trailer. If the trailer becomes unfastened from the truck, severance of the hose connectors brings about actuation of the valve device 1 so as to apply the trailer brakes at once to stop the trailer and hold it stationary long enough for the truck driver to stop his truck and return to the trailer to block the trailer wheels, etc. This emergency operation is brought about by automatic operation of the above-mentioned valve device 1 attached to the trailer. Its operation is as follows:

When the suction supply hose 22 breaks, atmospheric air pressure is admitted through the break to port 15 in the valve. This increase in absolute pressure is communicated to the recess 6 through passage 25. Recess 7 above the diaphragm communicates with the trailer suction reservoir 36. A differential pressure is therefore set up which causes the diaphragm to rise and thereby lift the plunger valve 9 with it. When said plunger valve rises it seals the port 15 thereby preventing the loss of suction therethrough from the reservoir 36. When said plunger valve rises it also opens communication between the reservoir 36, through port 17 and line 24, and the relay valve 35. This application of suction to the relay valve causes the valve to operate and thereby bring about operation of the trailer brakes. The trailer brakes then remain set as long as the suction of the trailer suction reservoir 36 lasts, due to possible leakage in the valve members. Thus when the truck and trailer separate, the emergency valve device 1 automatically seals the suction supply port and also connects the suction reservoir of the trailer to the relay valve on the trailer and causes immediate operation of the trailer brakes.

A check valve 48 is interposed in the line 30 between the engine or source of supply and the hose 22, so that atmospheric pressure cannot return to the hose or passage 22 from the intake manifold of the engine should the engine stall or the manifold vacuum decrease by opening the throttle or other contingency which would otherwise result in applying the trailer brakes as before described.

Emergency valve device 1 also has another function, that of intermittently connecting the suction supply with the trailer suction reservoir in such a manner as to maintain constant suction in said reservoir. When the degree of suction in the reservoir 36 falls below that in the supply pipe 30, i. e., when the absolute pressure in the reservoir is above that in the supply line, such differential pressure causes the diaphragm in the valve device 1 to move downwardly with the plunger valve 9 thereby connecting the supply to the reservoir by means of the port 18 in the hollow plunger valve. Thus the degree of suction in the supply and that in the reservoir is equalized after which the coil springs return the diaphragm and plunger valve upwardly a short distance to their normal positions.

This invention also contemplates the use of other means equivalent to the diaphragm 8 as shown and described above. Although the diaphragm type of construction is preferable, it may easily be replaced by a cylinder and piston which would be equally responsive to differential pressures. It will also be apparent to one skilled in the art that the emergency valve device described herein is applicable to other than vacuum brake systems as herein described.

What I claim is:

1. An emergency valve device comprising a body portion, a chamber therein, said body portion having a plurality of ports communicating with said chamber, and a reciprocable piston in said chamber for controlling communication between said ports, two of said ports being in communication with each other when said piston is in the normal position, said piston being responsive to an increase in the absolute pressure prevailing at a third port to establish communication between said third port and a fourth port while maintaining communication between said first two ports.

2. An emergency valve device comprising a body portion having a longitudinal chamber therein, said body portion having a plurality of ports longitudinally spaced and communicating with said chamber, and a piston adapted to reciprocate longitudinally in said chamber for controlling communication between said ports, two of said ports being in communication with each other when said piston is in the normal position, said piston being responsive to an increase in the absolute pressure prevailing at a third port to establish communication between said third port and a fourth port while maintaining communication between said first two ports.

3. An emergency valve device comprising a body portion, a chamber therein, said body portion having a plurality of ports communicating with said chamber, and means movably positioned in said chamber for controlling communication between said ports, said movable means being responsive to an increase in the absolute pressure prevailing at either of two ports, whereby said means will establish communication between said two ports upon a relative increase in the pressure prevailing at one of the two ports and establish communication between the latter port and a third port upon a relative increase in the pressure prevailing at the other of the two ports.

4. A valve device comprising a fitting having a chamber therein and having a recess at one end of said chamber, a hollow piston in said chamber, a diaphragm in said recess and clamped at its periphery in said fitting, a hollow stud extending through said diaphragm and engaging one end of said hollow piston, resilient means engaging said diaphragm, said fitting having a plurality of ports communicating with said chamber, one of said ports also communicating with said recess, said hollow piston having a plurality of ports cooperating with ports in said fitting.

5. A valve device comprising a fitting having a chamber therein and having a recess at one end of said chamber, a hollow piston in said chamber, a diaphragm in said recess and clamped at its periphery in said fitting, means for securing the center of said diaphragm to one end of said hollow piston, said means providing a communicating passage between one side of said diaphragm and the interior of said hollow piston, said fitting having a plurality of ports communicating with said chamber, one of said ports also communicating with said recess, said hollow piston having a plurality of ports cooperating with said ports in said fitting.

6. A valve device comprising a fitting having a chamber therein and having a recess at one end thereof, a hollow plunger in said chamber, pressure responsive means in said recess, a hollow stud extending through said pressure responsive means and engaging one end of said hollow plunger, spring devices in said recess engaging said pressure responsive means, said fitting having a plurality of ports communicating with said chamber, one of said ports communicating with said recess, said hollow plunger having a plurality of ports cooperating with said ports in the fitting.

7. An emergency valve device comprising, a body portion having a circular recess in one end thereof and a cylindrical chamber of less diameter than said recess and extending axially from said recess within said body portion, a closure cap for said circular recess, a flexible diaphragm positioned in said recess and having its periphery clamped between said body portion and said cap, a hollow plunger reciprocably positioned in said cylindrical chamber, a hollow stud extending through the center of said diaphragm to clamp the diaphragm to one end of said hollow plunger, a compression spring positioned in said recess between the cap and the diaphragm, a compression spring positioned in said recess between the body portion and the diaphragm, said body portion having a plurality of ports therein, said hollow plunger having a plurality of ports positioned in cooperative relation to said body portion ports, and a communicating passage between one of said body portion ports and the circular recess in said body portion.

WILLIAM J. BESLER.